United States Patent [19]

Marjo

[11] Patent Number: 5,558,435
[45] Date of Patent: Sep. 24, 1996

[54] SYSTEM FOR MIXING LIQUIDS

[75] Inventor: Erik Marjo, Manly, Australia

[73] Assignee: Pacific Inks (Australia) Pty Ltd., Beaconsfield, Australia

[21] Appl. No.: 336,002

[22] Filed: Nov. 8, 1994

[30] Foreign Application Priority Data

Jun. 21, 1994 [AU] Australia .................. PM6347

[51] Int. Cl.$^6$ .................. G05D 11/02; B01F 15/04
[52] U.S. Cl. .................. 366/141; 366/152.1
[58] Field of Search .................. 222/46, 64, 77; 366/138, 141, 152.1, 60.1–.3, 179.1, 181.6, 182.2

[56] References Cited

U.S. PATENT DOCUMENTS

| | | | |
|---|---|---|---|
| 4,403,866 | 9/1983 | Falcoff | 366/138 |
| 4,498,783 | 2/1985 | Rudolph | 366/141 |
| 4,621,927 | 11/1986 | Hiroi | 366/160.1 |
| 4,938,606 | 7/1990 | Kunz | 366/179.1 |
| 5,087,864 | 2/1992 | Abel | 366/141 |
| 5,110,521 | 5/1992 | Moller | 366/141 |
| 5,332,311 | 7/1994 | Volk | 366/138 |
| 5,340,211 | 8/1994 | Pratt | 366/138 |

*Primary Examiner*—David Scherbel
*Assistant Examiner*—Terrence R. Till
*Attorney, Agent, or Firm*—Cohen, Pontani, Lieberman, Pavane

[57] ABSTRACT

A liquid mixing system for preparing batches of liquids including paints and dyes in a mixing vessel provided with agitation means; delivery of mixing constituents to the mixing vessel being computer controlled and effected by positive displacement pumps transferring liquids from individual supply conduits and reservoirs via spring loaded single action check valves; the amount of constituent added to the mixing vessel being metered by the computer on the basis of constituent liquid weight monitored by a load cell at the mixing vessel; the delivery of constituent liquid to the mixing vessel under the control of the computer becoming incremental after delivery of a percentage between 80–99.9% of the target weight to the mixing vessel in order that the precise target weight be achieved.

10 Claims, 1 Drawing Sheet

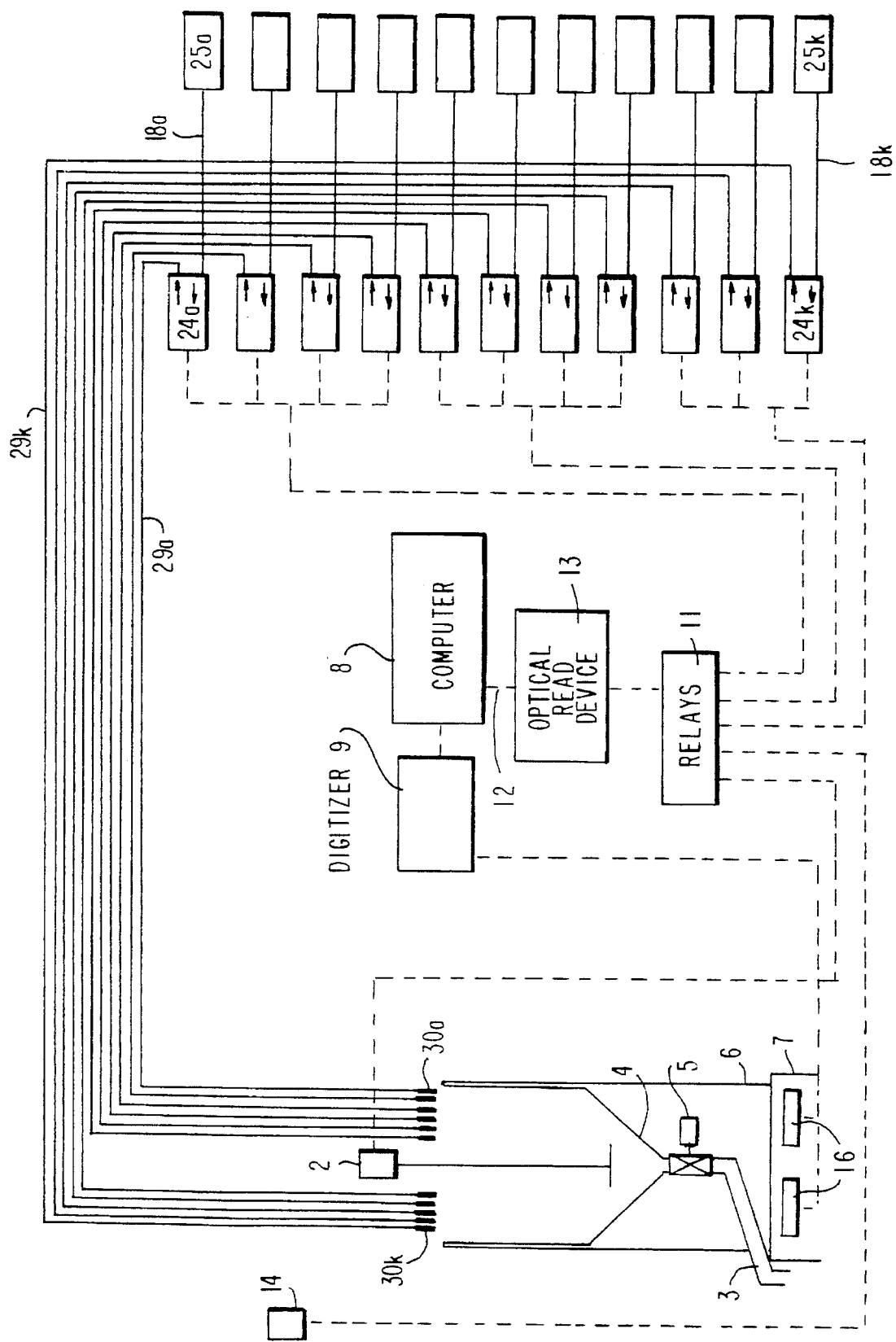

SYSTEM FOR MIXING LIQUIDS

FIELD OF THE INVENTION

The present invention relates to a system for mixing liquids into batches of varying composition and of varying volume and has particularly useful application in the preparation of inks, paints and dyes.

BACKGROUND ART

For many years there has been a need to compound batches of liquid materials from liquid constituents where each batch may be of a different composition and volume. In order that the same equipment may be utilised to prepare successive batches elaborate control systems are necessary in order to ensure that constituent liquids are mixed in precisely the correct quantities. To this end a number of systems have utilised fluid flow in order to gauge the correct volume of constituents. Such systems additionally utilise dedicated computerised controllers. Systems with dedicated controllers and utilising the flow of ingredients to ensure accuracy have for example been utilised in the textile industry. The use of fluid flow as a measure of constituents involves the use of complicated valves and other hardware and the use of dedicated controllers is expensive. It is accordingly an object of the present invention to ameliorate one or more of the lastmentioned disadvantages with existing systems or at least to provide the market with an alternative.

SUMMARY OF THE INVENTION

According to the present invention there is provided a liquid mixing system comprising a mixing vessel provided with agitation means, a load cell capable of determining the weight of material in the mixing vessel, two or more fluid supply conduits each dedicated to transfer fluids from separate supply reservoirs to the mixing vessel; a positive displacement electric pump dedicated to each supply conduit; a spring loaded single action check valve in each supply conduit; a computer system for controlling the electric pumps and hence the supply of constituent liquids to the mixing vessel; the amount of each constituent added to the mixing vessel being metered by the computer on the basis of constituent liquid weight monitored by the load cell at the mixing vessel; the computer being programmed to turn the relevant electric pump on or off according to the amount of constituent liquid required in the mixing vessel; the accuracy of the metering of constituent liquid into the mixing vessel being enhanced by introduction of constituent liquids into the mixing vessel under computer control in accordance with the following sequence;

(a) Matching the product required by the operator to constituent weight information stored in or programmed into the computer system in order to determine the weight of constituent liquid required;

(b) Turning the relevant electric supply pump on for a time period adequate to supply between 80–99.9% of the target weight of constituent liquid to the mixing vessel;

(c) After the pump has stopped operating checking information from the load cell to ascertain whether the target weight of constituent liquid has been deposited in the mixing vessel;

(d) Reactivating the pump for a short time period corresponding to the time necessary for the pump to deliver a discrete weight of constituent liquid to the mixing vessel; such discrete weight of constituent liquid being equal to or less than the acceptable margin for error in the target weight of constituent liquid required for the batch concerned;

(e) Again checking the signal from the load cell to determine whether the weight of constituent liquid which has been supplied is within the acceptable margin for error; and (f) Repeating steps (d) and (e) until such time as the weight of constituent liquid supplied to the mixing vessel is within the acceptable margin for error for the batch concerned.

The foregoing as well as additional details of the present invention will become apparent from the following detailed description and annexed drawing, which is only conceptual in nature and not drawn to scale, of the presently preferred embodiments thereof.

BRIEF DESCRIPTION OF THE DRAWING

The FIGURE is a schematic diagram of an ink blending system for use in connection with the printing industry.

DETAILED DESCRIPTION OF THE PREFERRED EMBODIMENTS

The system depicted in the FIGURE comprises a mixing vessel 1 provided with an electrically driven mixer 2. The vessel terminates at its lower extremity in an outlet pipe 3 commencing at the base of conical section 4 adjacent the lower extremity of the vessel. The egress of liquids from the vessel is controlled by air actuated valve 5.

The mixing vessel 1 is supported by structure 6 which in turn bears upon load cell platform 7 containing load cells 16. The load cell platform 7 is adapted to supply information to a computer 8 indicating the weight of material which has been added to the mixing vessel at any time; such information being received by the computer as an appropriate electronic signal after conversion by digitiser unit 9.

Twelve electrically driven positive displacement (Archimedes screw type) pumps 24a–k and are provided such that one pump may be dedicated to each constituent liquid which may be utilised to compound a batch of product being mixed in mixing vessel 1. Each pump draws from a reservoir 25 1–k via a dedicated conduit 18a–k and outputs to the mixing vessel via a dedicated output conduit 29a–k.

Each output conduit 29 is provided with a spring loaded single action check valve 30a–k of the type which is normally biased to a closed position by a spring but opens to permit flow in one direction in response to line pressure upstream. The electrical supply (not shown) required to activate the pumps 24a–k is controlled by relays 11 which are themselves activated by the computer 8 via optical output lines 12 and optical read device 13.

Relays 11 additionally control a wash solenoid 14 adapted to control supply of pressurised water or solvent via spray nozzles (not shown) to mixing vessel 1 for the purposes of cleaning.

In practice the system above described with reference to the FIGURE would operate as follows.

The user would select from a menu a particular colour of ink which was required to be mixed and input this colour to the computer 8. The required batch size would also be entered to the PC and the PC would then retrieve the ratio of constituents required from memory and calculate the required amount of each constituent to produce the batch size requested. The weight of constituents required would be converted to pump "on" times having regard to the known ratings of the pumps utilised.

Constituents would then be sequentially added to the mixing vessel 1 in accordance with the following steps.

The majority of one constituent less a small discrete amount would be added to the mixing vessel by activation of the relevant pump 24. This majority of the constituent being hereinafter referred to as the FAST FEED amount. In the case of a batch requiring a 50 kg weight of one constituent this FAST FEED amount may be 49.5 kg. The computer 8 therefore activates the relevant pump 24 for an appropriate time to supply approximately 49.5 kg to the mixing vessel then the relevant pump 24 is turned off. After introduction of the FAST FEED amount the relevant pump 24 remains off until a stable weight reading is supplied to the computer 8 by the load cells 16.

If the weight of constituent in the mixing vessel 1 is determined by the computer 8 to be less than the required weight, after allowance for an acceptable error margin, then the computer 8 reactivates the relevant pump 24 for a short pulse calculated to supply a small amount of constituent to the mixing vessel in order to make up the difference between the required weight and the FAST FEED amount already introduced. The pulse time for the pump would be sufficiently short so that the amount of material introduced into the mixing vessel by each pulsed "on" period of the pump would be less than the predetermined margin for error in relation to the total weight of constituent required in the mixing vessel.

After each pulse the computer again takes a reading from the load cell in order to determine whether the weight of constituent introduced to the mixing vessel is within tolerances. It is only once the weight of constituent added to the mixing vessel is within tolerances that the computer ceases activating the relevant pump 24 in pulse mode and then proceeds by activating another pump to introduce the next constituent in a similar manner by activating another pump or alternatively conclude the mixing process.

The computer also controls the mixer 2 in order to ensure adequate mixing.

The computer 8 additionally controls the cleaning function for the mixing vessel whereby water or other solvent may be delivered to the mixing vessel via one or more spray jets (not shown) in order that the mixing vessel may be automatically cleaned after each batch is released.

One advantage of the present system is that it readily facilitates the production of varying batch sizes and even recycling of leftover product as well as automatic compensation for errors in introduction of one or more constituents. These lastmentioned features are a feature of the versatility of the computer 8 being utilised to control the system and the capability of the computer to rescale the batch.

Assume for example that a simple ink batch were being prepared with three constituent liquids and an excess of constituent 1 were added such that the resulting ink did not match a control sample. The batch could be recycled and the mistake corrected by merely rescaling the batch so as to utilise the excess of constituent 1 by appropriately increasing the amounts of constituents 2 and 3.

It should be appreciated that variations from the system above described may be devised without departing from the scope and intendment of the present invention and for example it is not necessary to utilise optical read out devices to control the relays for the pumps. The wash cycle could additionally be varied and may utilise the mixer rather than pressurised jets. Thus, the preferred embodiment and examples described herein are for illustrative purposes only and are not to be construed as limiting the scope of the present invention which is properly delineated only in the appended claims.

The claims defining the invention are as follows:

1. A liquid mixing system comprising a mixing vessel provided with agitation means, a load cell capable of determining the weight of material in the mixing vessel, a plurality of liquid supply conduits each conduit dedicated to transfer one of a plurality of constituent liquids from corresponding separate supply vessels to the mixing vessel, each liquid having a corresponding liquid weight; a positive displacement pump dedicated to each supply conduit; a computer system for controlling the pumps for controlling the supply of the plurality of constituent liquids to the mixing vessel, the amount of each constituent liquid added to the mixing vessel being metered by the computer on the basis of the corresponding constituent liquid weight monitored by the load cell at the mixing vessel, the computer being programmed to activate said positive displacement pumps for a predetermined length of time according to a predetermined weight of each constituent liquid required in the mixing vessel, the accuracy of the metering of each constituent liquid into the mixing vessel being enhanced by said computer being programmed to introduce substantially all of a predetermined quantity of each of said constituent liquids into the mixing vessel one at a time according to a predetermined sequence and, before a next constituent liquid is introduced, measuring the weight of the already-introduced constituent liquid to determine if an additional amount of said already-introduced liquid is required and, if so, reactivating said pump corresponding to said already-introduced liquid for an additional predetermined period of time until said predetermined weight is achieved.

2. The liquid mixing system of claim 1 wherein the system is provided with a means in communication with the mixing vessel for supplying a washing solvent under pressure to the mixing vessel for cleaning the mixing vessel.

3. The liquid mixing system of claim 1 wherein the computer is programmed to produce variable batch sizes of mixed liquid comprised of said plurality of constituent liquids in the mixing vessel.

4. The liquid mixing system of claim 1 wherein the computer is programmed for re-activating select ones of said positive displacement pumps in said plurality for adding constituent liquids to a first incorrectly constituted batch of liquid product in the mixing vessel so as to produce from the first incorrectly constituted batch a second correctly constituted batch of liquid product, the constituent liquids of the first batch being at least part of the constituent liquids of the second batch.

5. A liquid mixing system comprising:

a mixing vessel;

agitation means disposed in said mixing vessel;

a load cell for determining the weight of material contained in the mixing vessel;

a plurality of liquid supply conduits, each conduit in said plurality being dedicated to the transfer of one of a plurality of constituent liquids from corresponding supply reservoirs to the mixing vessel, each liquid having a corresponding liquid weight;

a plurality of supply means, each dedicated to a corresponding supply conduit, for supplying the constituent liquids to said mixing vessel;

a computer for controlling the amount of constituent liquids provided to the mixing vessel by controlling said supply means, the amount of each constituent liquid provided to the mixing vessel being metered by the computer on the basis of the corresponding constituent liquid weight monitored by the load cell at the mixing vessel;

the computer being programmed to activate a select one of said supply means according to an amount of constituent liquid required in the mixing vessel, so that the precise amount of each selected constituent liquid can be accurately measured, the computer being further programmed for re-activating select ones of said supply means for adding constituent liquids to a first incorrectly constituted batch of liquid product in the mixing vessel so as to produce from the first incorrectly constituted batch, a second correctly constituted batch of liquid product, the constituent liquids of the first batch being at least part of the constituent liquids in the second batch.

6. The liquid mixing system of claim 5, wherein the system is provided with an outlet in communication with the mixing vessel for supplying a washing solvent under pressure to the mixing vessel for cleaning the mixing vessel.

7. The liquid mixing system of claim 5, wherein the computer is programmed to produce variable batch sizes of mixed liquid comprised of said plurality of constituent fluids in the mixing vessel.

8. A method of mixing, in a mixing vessel, a composite liquid comprised of a plurality of constituent liquids with each liquid having a corresponding liquid weight, the method comprising the steps of:

(a) activating, from a plurality of conduits, a selected conduit for a predetermined length of time for supplying said mixing vessel with a selected constituent liquid in said plurality so as to provide a predetermined amount of said selected constituent liquid to said mixing vessel;

(b) measuring the weight of said selected constituent liquid in said mixing vessel;

(c) determining, based on the measured weight, the amount of said selected constituent liquid in said mixing vessel;

(d) comparing the determined amount of said selected constituent liquid to said predetermined amount;

(e) re-activating said selected conduit for a second predetermined length of time, if said determined amount is less than said predetermined amount, to supply said mixing vessel with an additional amount of said selected constituent liquid to achieve said predetermined amount in said mixing vessel;

(f) repeating steps (a)–(e) for the other constituent liquids in said plurality of constituent liquids comprising said composite liquid; and (g) activating an agitation means when the predetermined amounts of said constituent liquids are in said mixing vessel for mixing said composite liquid in said mixing vessel.

9. The method of claims 8, wherein said re-activating step (e) further comprises scaling the composite liquid by re-activating selected conduits of said plurality of conduits for a predetermined length of time if said determined amount of a selected constituent liquid is greater than said predetermined amount, so as to maintain a predetermined ratio of constituent liquids comprising the composite liquid.

10. The method of claim 8, wherein said activating step (a) further comprises activating a selected conduit to provide between 80–99.9% of a target weight of said selected constituent liquid to said mixing vessel.

* * * * *